United States Patent [19]
Cronin et al.

[11] Patent Number: 5,995,589
[45] Date of Patent: Nov. 30, 1999

[54] MOBILE TELEPHONE CONFIGURABLE AS A MONITOR AND A TWO WAY RADIO

[75] Inventors: Gérard Cronin, La Milesse; Christophe Lorieau, Guecelard; Rémy De Crouy-Chanel, Le Mans, all of France

[73] Assignee: U.S. Philips Corporation, New York, N.Y.

[21] Appl. No.: 09/056,840

[22] Filed: Apr. 7, 1998

[30] Foreign Application Priority Data

Apr. 11, 1997 [FR] France .................................. 97 04456

[51] Int. Cl.⁶ .................................................. H04M 11/04
[52] U.S. Cl. .............................................. 379/38; 455/555
[58] Field of Search ........................... 379/37–51, 110.01; 455/403, 404, 555

[56] References Cited

U.S. PATENT DOCUMENTS

| | | |
|---|---|---|
| 4,503,288 | 3/1985 | Kessler . |
| 4,571,455 | 2/1986 | Labock et al. .............................. 379/42 |

FOREIGN PATENT DOCUMENTS

| | | | |
|---|---|---|---|
| 0635962 | 1/1995 | European Pat. Off. . | |
| 0208080A1 | 1/1997 | European Pat. Off. | ....... H04M 11/04 |
| 2756998 | 6/1998 | France . | |
| 19532103 | 3/1997 | Germany . | |
| 19629535A1 | 12/1997 | Germany | ........................ H04M 1/00 |
| 2304002A | 3/1997 | United Kingdom | ............. H04Q 7/32 |

OTHER PUBLICATIONS

By Vitaly Lenchik et al. "Method for Remote Signaling Subscriber Unit into VOX Mode" Motorola Technical Developments vol. 22 Jun. 1, 1994, p. 74.

*Primary Examiner*—Wing F. Chan
*Attorney, Agent, or Firm*—Dicran Halajian

[57] ABSTRACT

A telephony device is disclosed having a base station connectable to a switched network. At least two mobile units are connectable to the switched network through the base station to receive incoming calls in a normal mode. The first mobile unit is operable in a monitor mode, where ringing thereof is prevented when incoming calls are received in the monitor mode. A microphone of the monitoring unit has a higher gain in the monitor mode than in the normal mode. In the monitor mode, transmission of sound signals to monitoring unit is suppressed.

13 Claims, 3 Drawing Sheets

MOBILE TELEPHONE CONFIGURABLE AS A MONITOR AND A TWO WAY RADIO

The invention relates to a telephony device comprising a base station connected to the switched network, at least two subscriber units possibly comprising, inter alia, a microphone suitable for being used in telephone links.

The invention also relates to a method implemented in such a device and also a subscriber unit (handset) suitable for such a device.

The invention finds interesting applications in cordless analog devices for those satisfying the DECT standard or others.

These devices are arranged predominantly for realizing links between subscriber units and the exterior over the switched network. However, other possibilities are open to the user such as, for example, the well-known function of intercom, which permits of a voice link between a subscriber unit and a base station without making use of the telephone network. This may be used for applications such as that which comprises the babysit function. A description of such function will be found in the patent application filed in France in the name of the applicants on Dec. 6, 1996 under No. 96 15047. This function is predominantly ensured by a link established between the base station and one of the subscriber units.

The present invention proposes a device of the type defined in the opening paragraph which permits of the use of the device in other functions which do not of necessity utilize the switched network and which permits of a link between subscriber units.

Therefore, such a device is characterized in that monitoring links are provided for exchanging data between the subscriber units.

The idea of the invention consists of utilizing the subscriber units which are generally mobile units and which may thus be displaced easily in locations which are not supplied with electric current, by utilizing thus the accumulator they habitually have.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
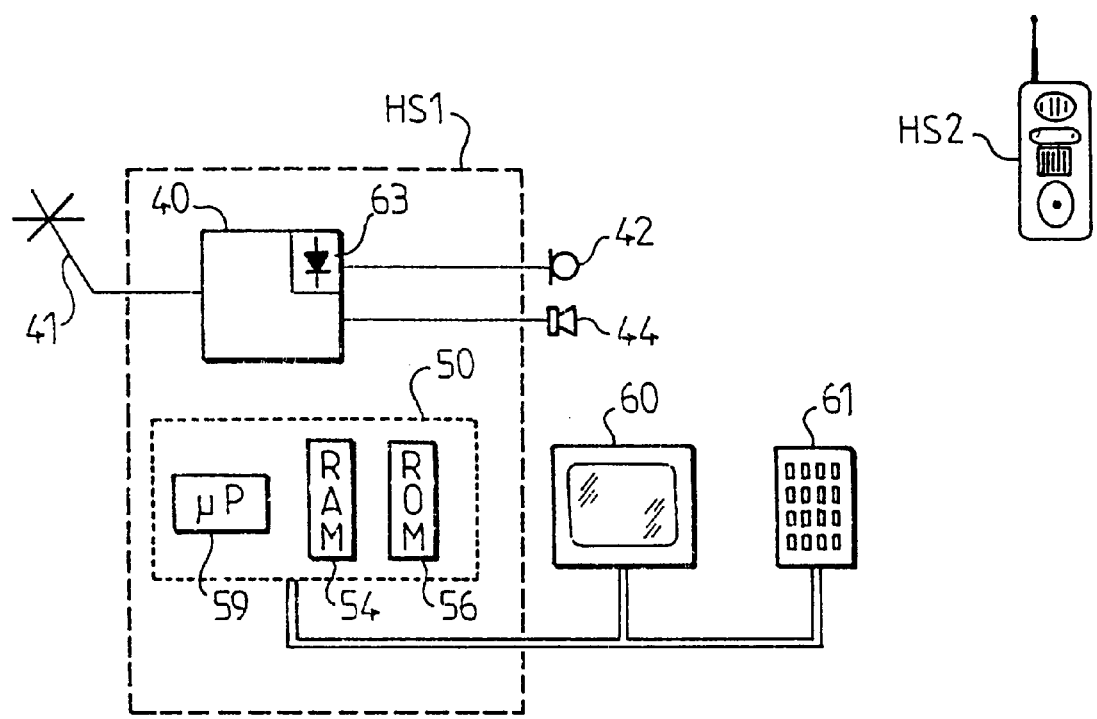
FIG. 1 shows a device according to the invention.
Figure 1:
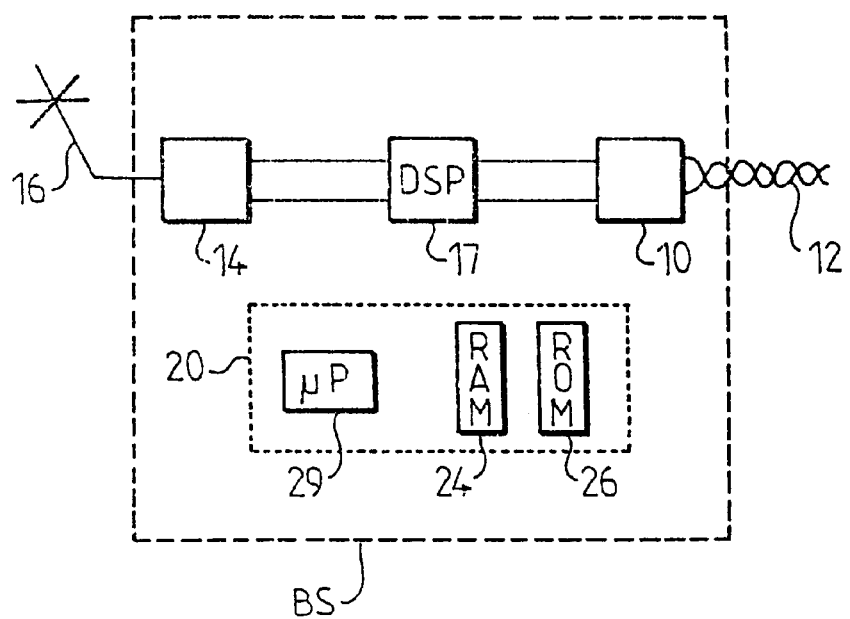

In FIG. 1, the device that is represented is a device satisfying the DECT standards. It is formed by a base station BS and a plurality of subscriber units (handsets) of which only the units HS1 and HS2 are shown. Furthermore, the unit HS1 is shown in more detail.

The base station BS comprises a line interface circuit 10 for connection to the telephone line 12 and a transceiver assembly 14 which includes an antenna 16 to be connected by radio to the subscriber units HS1, HS2. For processing all the analog-type data this base station further includes a signal processing element 17 formed around a digital signal processor DSP which notably processes voice signals. All the elements of this base station BS are managed by a microprocessor management assembly 20. Habitually, the latter is notably formed by a random access memory 24, a read only memory 26 containing the instructions of operation of the device and a management processor 29.

The subscriber unit HS1, the only one being shown in detail (the unit HS2 may have an identical structure), comprises a communication assembly 40 with an antenna 41 which permits of communication with the base station BS and from there with the other subscriber units HS2, . . . This assembly processes the data coming from the microphone 42 and also produces the signals for an earphone 44. There is also provided a compound management element 50 formed, as with the management element 20, by a random access memory 54, a read only memory 56 containing the operating instructions of the device, and a management processor 59. The unit HS1 also includes a screen 60 on which various data are displayed, and a keyboard 61. These handsets are mobile units and because of this they have an accumulator (not shown in the Figure).

According to a characteristic feature of the invention, a threshold detector 63 is provided incorporated in the communication assembly 40.

Figure 2:
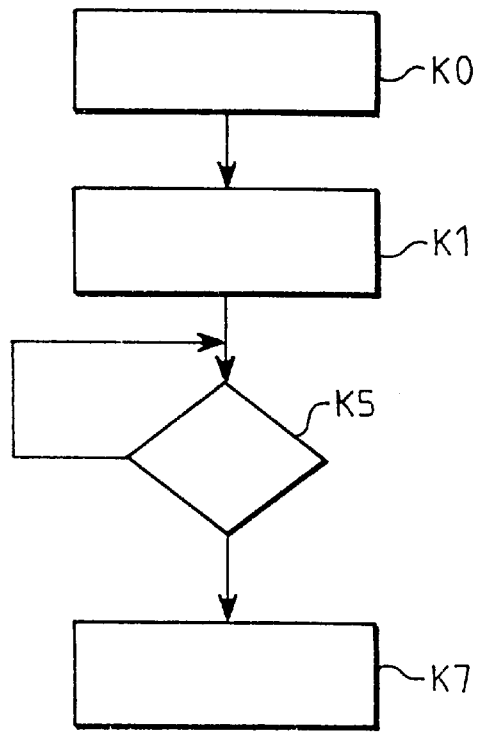
FIG. 2 shows a first flow chart explaining the operation of the device according to the invention.

In FIG. 2 is shown a flow chart which explains the operation of a device according to the invention in a first exemplary embodiment.

This flow chart is utilized via a set of instructions contained in the subscriber unit called monitored unit involved by the monitoring functions of a passive object, that is the case when earlier adapted to babysitting. The subscriber unit is placed in the premises, the room, where the passive object is.

This flow chart begins with box K0 which indicates a state of rest. Then the state indicated by box K1 is proceeded to. This state K1 consists of making a scrolling menu appear on the screen 60 up to making the item of babysitting appear. The result of this confirmed item is that the ringing is prevented from starting and the handset is put to a special state in which, when it is called by another handset (intercom), the microphone is automatically activated (possibly with a higher gain than that of a normal intercom conversation) and the transmission of any sound is suppressed. As long as no additional manoeuvres are carried out, which are detected in box K5, the subscriber unit remains in this standby mode. An additional manoeuvre brings one to box K7 with a new action is analyzed.

Figure 3:
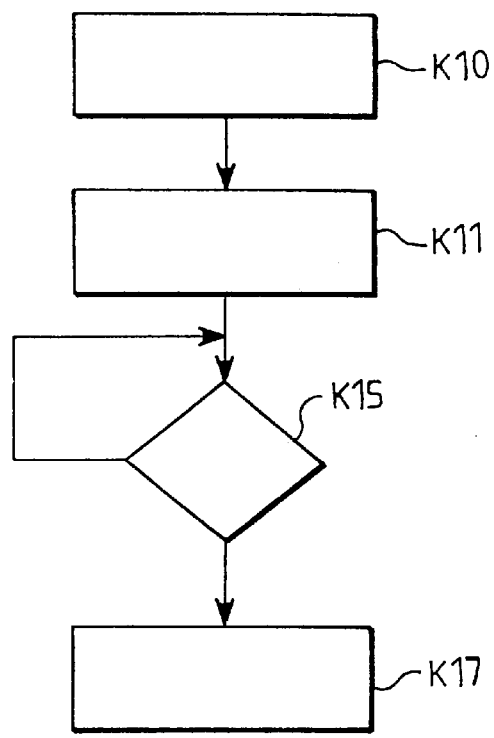
FIG. 3 shows a second flow chart explaining the operation of the device according to the invention.

FIG. 3 relates to a flow chart of the handset called standby handset. This flow chart begins with box K10 which indicates a state of rest. Then the state indicated by the box K11 is proceeded to. The state K11 consists of depressing a dedicated key and dialling the number of the standby handset. The result of this is that the two handsets are connected. The volume of the earphone 44 will be set to the position of listening to the noise coming from the baby's room. This state of affairs is maintained (standby status) as long as a key on the keyboard of the subscriber unit has not been depressed (box K15). If that is the case, this new action is analyzed (box K17).

Figure 4:
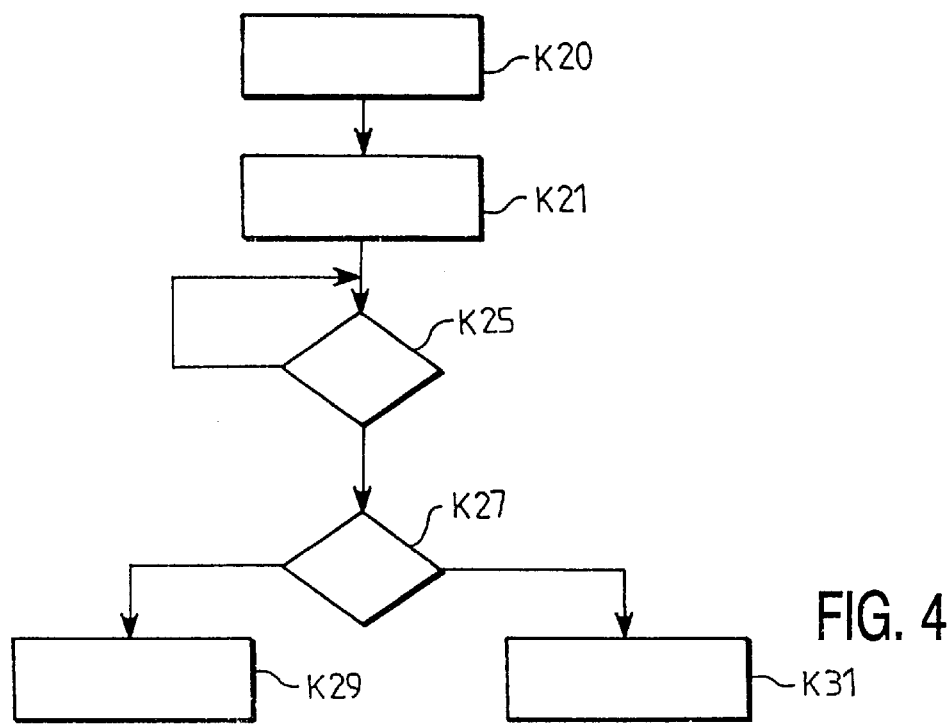
FIG. 4 shows a third flow chart explaining the operation of the device according to the invention.

FIG. 4 also relates to the monitoring function for the passive object where the monitoring link will be started when too strong a noise has been detected by the threshold detector 63. This mode of operation is advantageous when one wishes to economize on the load of the accumulator, because the link will only be effective when an unwanted noise has been detected. The boxes K20, K21 and K25 of this flow chart, similarly to the boxes K0, K1 and K5 respectively, need not be explained. Once an event has been detected, which takes place in box K25, this event is analyzed in box K27. Then there is determined whether it is the microphone that has captured too much noise. If it has, box K29 is the box that indicates the setting up of the monitoring link. The box K31 relates to another process which puts an end to this mode of operation.

The monitoring unit is put to the state of rest once the number of the monitored unit has been dialled.

Figure 5:
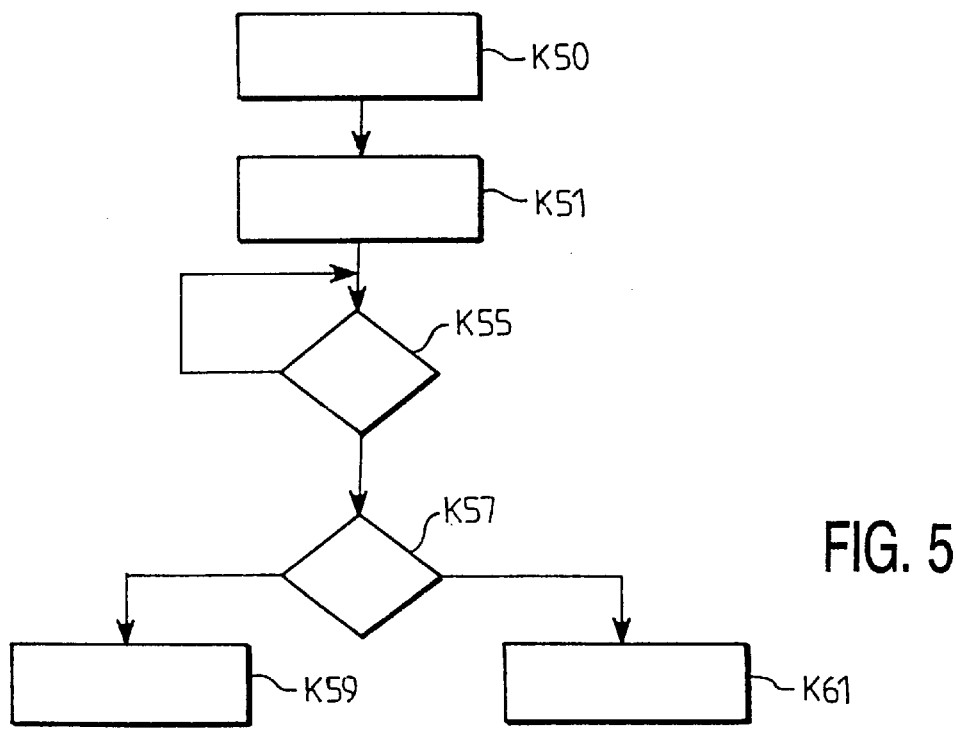
FIG. 5 shows a fourth flow chart explaining the operation of the device according to the invention.

Another embodiment comprises the monitoring of an active object, that is to say, an object that itself wishes to establish a link already established before by only very few movements. For example, the depression of a single key. This is shown in FIG. 5 whose shape is similar to that of FIG. 3, the boxes K50, K51, K55, K57, K59 and K61 may be compared with the respective boxes K20, K21, K25, K27, K29 and K31. The only difference is that in box K57 the depression of a key for starting a set up of a connection is detected.

We claim:

1. A telephony device comprising:
   a base station connectable to a switched network; and
   a first mobile unit and a second mobile unit which are connectable to said switched network through said base station to receive incoming calls in a normal mode;
   said first mobile unit being operable in a monitor mode, wherein ringing of said first mobile unit is prevented when said incoming calls are received in said monitor mode.

2. The telephony device of claim 1, wherein a microphone of said first mobile unit has a higher gain in said monitor mode than in said normal mode.

3. The telephony device of claim 1, wherein transmission of sound signals to said first mobile unit is suppressed in said monitor mode.

4. The telephony device of claim 1, wherein said monitor mode is entered from a menu displayed on a screen of said first mobile unit.

5. The telephony device of claim 1, wherein said first mobile unit is activated in said monitor mode by a signal from said second mobile unit.

6. The telephony device of claim 1, wherein said first mobile unit is activated and deactivated in said monitor mode by a signal from said second mobile unit.

7. The telephony device of claim 1, wherein said first mobile unit is activated in said monitor mode by a sound.

8. The telephony device of claim 1, wherein said first mobile unit includes a detector which activates said first mobile unit in said monitor mode when a sound is detected.

9. The telephony device of claim 1, wherein said first mobile unit is connected to said second mobile unit when keys on one of said first mobile unit and said second mobile unit are activated.

10. The telephony device of claim 1, wherein a connection between said first mobile unit and said second mobile unit is established when a single key on one of said first mobile unit and said second mobile unit is activated.

11. The telephony device of claim 10, wherein said connection does not use said switched network.

12. A telephony device comprising:
    a base station connectable to a switched network; and
    a first mobile unit and a second mobile unit which are connectable to said switched network through said base station to receive incoming calls in a normal mode;
    said first mobile unit being operable in a monitor mode, wherein, after establishing a link between said first mobile unit and said second unit, said link is activated without using said switched network when a single key on one of said first mobile unit and said second mobile unit is activated.

13. A telephony device comprising:
    a base station connectable to a switched network; and
    a first mobile unit and a second mobile unit which are connectable to said switched network through said base station to receive incoming calls in a normal mode;
    said first mobile unit being operable in a monitor mode, wherein a microphone of said first mobile unit has a higher gain in said monitor mode than in said normal mode.

\* \* \* \* \*